United States Patent [19]
Nakhimovsky

[11] Patent Number: 6,058,460
[45] Date of Patent: May 2, 2000

[54] MEMORY ALLOCATION IN A MULTITHREADED ENVIRONMENT

[75] Inventor: Gregory Nakhimovsky, Wakefield, Mass.

[73] Assignee: Sun Microsystems, Inc., Palo Alto, Calif.

[21] Appl. No.: 08/673,382

[22] Filed: Jun. 28, 1996

[51] Int. Cl.[7] ........................................ G06F 12/06
[52] U.S. Cl. ..................... 711/153; 711/173; 711/152; 707/205; 709/104
[58] Field of Search .................................. 711/153, 173, 711/129, 152, 202; 707/205, 206; 709/104

[56] References Cited

U.S. PATENT DOCUMENTS

| | | | |
|---|---|---|---|
| 4,805,097 | 2/1989 | De Sanna ................................. | 711/206 |
| 5,339,415 | 8/1994 | Strout, II et al. ....................... | 709/102 |
| 5,434,992 | 7/1995 | Mattson .................................. | 711/173 |
| 5,557,786 | 9/1996 | Johnson, Jr. ............................ | 707/101 |
| 5,566,321 | 10/1996 | Pase et al. .............................. | 711/153 |
| 5,588,138 | 12/1996 | Bai et al. ................................ | 711/173 |
| 5,590,326 | 12/1996 | Manabe .................................. | 711/150 |
| 5,684,993 | 11/1997 | Willman ................................. | 709/107 |
| 5,727,178 | 3/1998 | Pletcher et al. ......................... | 711/202 |
| 5,784,697 | 7/1998 | Funk et al. .............................. | 711/170 |

FOREIGN PATENT DOCUMENTS

| | | |
|---|---|---|
| 0 273 612 A2 | 7/1988 | European Pat. Off. . |
| 0 633 531 | 1/1995 | European Pat. Off. . |

OTHER PUBLICATIONS

IBM Technical Disclosure Bulletin, "Method of Managing Main Storage Areas that are Shared . . . ", vol. 37, No. 1, Jan. 1, 1994, p. 231 XP000428757.

"Improving malloc Performance". Antony Davies, *Sun Opsis*, vol. 4, No. 3, (Nov. 1995).

*Primary Examiner*—Hiep T Nguyen
*Attorney, Agent, or Firm*—Kudirka & Jobse LLP

[57] ABSTRACT

A method of allocating memory in a multithreaded (parallel) computing environment in which threads running in parallel within a process are associated with one of a number of memory pools of a system memory. The method includes the steps of establishing memory pools in the system memory, mapping each thread to one of the memory pools; and, for each thread, dynamically allocating user memory blocks from the associated memory pool. The method allows any existing memory management malloc package to be converted to a multithreaded version so that multithreaded processes are run with greater efficiency.

27 Claims, 4 Drawing Sheets

MEMORY ALLOCATION IN A MULTITHREADED ENVIRONMENT

BACKGROUND OF THE INVENTION

The invention relates to memory allocation and more particularly to memory allocation in a multithreaded (parallel) environment.

In allocating memory for a computer program, most older languages (e.g., FORTRAN, COBOL) require that the size of an array or data item be declared before the program is compiled. Moreover, the size of the array or data item could not be exceeded unless the program was changed and recompiled. Today, however, most modern programming languages, including C and $C^{++}$, allow the user to request memory blocks from the system memory at run-time and release the blocks back to the system memory when the program no longer needs the blocks. For example, in these modern languages, data elements often have a data structure with a field containing a pointer to a next data element. A number of data elements may be allocated, at run-time, in a linked list or an array structure.

The C programming language provides memory management capability with a set of library functions known as "memory allocation" routines. The most basic memory allocation function is called malloc which allocates a requested number of bytes and returns a pointer that is the starting address of the memory allocated. Another function known as free returns the memory previously allocated by malloc so that it can be allocated again for use by other routines.

In applications in which memory allocation occurs in parallel, for example, in a multithreaded process, the malloc and free functions must be "code-locked". Code-locking means that the library code of the process containing the thread is protected with a global lock. This prevents data corruption in the event that one thread is modifying a global structure when another thread is trying to read it. Code-locking allows only one thread to call any of the malloc functions (e.g., malloc, free, realloc) at any given time with other threads waiting until the thread is finished with its memory allocation. Thus, in a multithreaded process in which memory allocation functions are used extensively, the speed of the system is seriously compromised.

SUMMARY OF THE INVENTION

In general, in one aspect, the invention is a method of allocating memory in a multithreaded computing environment in which threads running in parallel within a process each have an associated memory pool in a system memory. The method includes the steps of establishing memory pools in the system memory, mapping each thread to one of the memory pools; and, for each thread, dynamically allocating user memory blocks from the associated memory pool. Each thread uses memory allocation routines (e.g., malloc) to manipulate its own memory pool, thereby providing greater efficiency of memory management.

The invention converts an existing memory management malloc package to a multithreaded version so that multithreaded processes are run with greater efficiency. Moreover, the invention is applicable to any application requiring memory management in parallel; in particular, those applications requiring significant parallel memory management. Furthermore, use of the invention is transparent from the application programmer's standpoint, since the user interface is the same as that of the standard C library memory management functions (i.e., malloc, free, realloc).

In a preferred embodiment, the method may further include the step of preventing simultaneous access to a memory pool by different threads. Having separate memory pools allows separate code-locking (e.g., mutex locking) to prevent simultaneous access to the memory pools by the different threads, thereby eliminating the possibility of data corruption. In existing standard memory allocation routines suitable for parallel execution, there is only a single code lock. Thus, only one thread can make a memory allocation routine call at any given time. All other threads running in the process must wait until the thread finishes with its memory allocation operation. In the invention, on the other hand, so long as each thread is manipulating its own memory, memory allocation operations can be performed in parallel without any delay. The separate code-locking feature only becomes important when a thread attempts to access the memory pool of another thread. Such memory allocations of a memory pool not associated with that thread are fairly uncommon. Thus, the invention provides an improvement in the performance of the multithreaded process by significantly reducing time delays associated with memory allocation routine calls.

Preferred embodiments may include one or more of the following features. The step of dynamically allocating memory blocks includes designating the number of bytes in the block desired to be allocated. For example, calling the malloc function will allocate any number of required bytes up to a maximum size of the memory pool. The step of establishing a memory pool for each thread may further include allocating a memory buffer of a preselected size (e.g., 64 Kbytes). In the event that the size of the memory pool has been exhausted, the size of the memory pool may be dynamically increased by allocating additional memory from the system memory in increments equal to the preselected size of the buffer memory. Moreover, the method may further include allowing one of the threads to transfer memory from the memory pool of another of the threads to its memory pool.

Each memory pool may be maintained as a data structure of memory blocks, for example, an array of static variables identified by a thread index associated with one of the memory pools. The data structure includes a header which includes the size of the memory block and the memory pool index to which it is associated. The size of the block and the memory pool index may both be, for example, four bytes.

The method may further include the step of allowing each thread to deallocate or free a memory block to the memory pool. The application may require that the memory block be freed from the thread which originally allocated the memory block. Other applications may allow the memory block to be freed from a thread which did not originally allocate the block.

Coalescing or merging deallocated (or freed) memory blocks may be performed to unite smaller fragmented blocks. However, the method prevents coalescing of memory blocks from different pools.

In the event that the size of a memory block needs to be enlarged in order to store more data elements, the size of an allocated block of memory allocated by a memory pool may be changed using a realloc routine. The method requires that realloc preserves the original memory pool.

In general, in another aspect, the invention is a computer-readable medium storing a computer program for allocating memory in a multithreaded computing environment in which threads run in parallel within a process, each thread having access to a system memory. The stored program includes computer-readable instructions: (1) which establish a plurality of memory pools in the system memory; (2) which map each thread to one of said plurality of memory pools; and (3) which, for each thread, dynamically allocate user memory blocks from the associated memory pool. A computer-readable medium includes any of a wide variety of memory media such as RAM or ROM memory, as well as, external computer-readable media, for example, a computer disk or CD ROM. A computer program may also be downloaded into a computer's temporary active storage (e.g., RAM, output buffers) over a network. For example, the above-described computer program may be downloaded from a Web site over the Internet into a computer's memory. Thus, the computer-readable medium of the invention is intended to include the computer's memory which stores the above-described computer program that is downloaded from a network.

In another aspect of the invention, a system includes memory, a portion of which stores the computer program described above, a processor for executing the computer-readable instructions of the stored computer program and a bus connecting the memory and processor.

Other advantages and features will become apparent from the following description of the preferred embodiment and from the claim.

DESCRIPTION OF THE PREFERRED EMBODIMENTS

Figure 1:
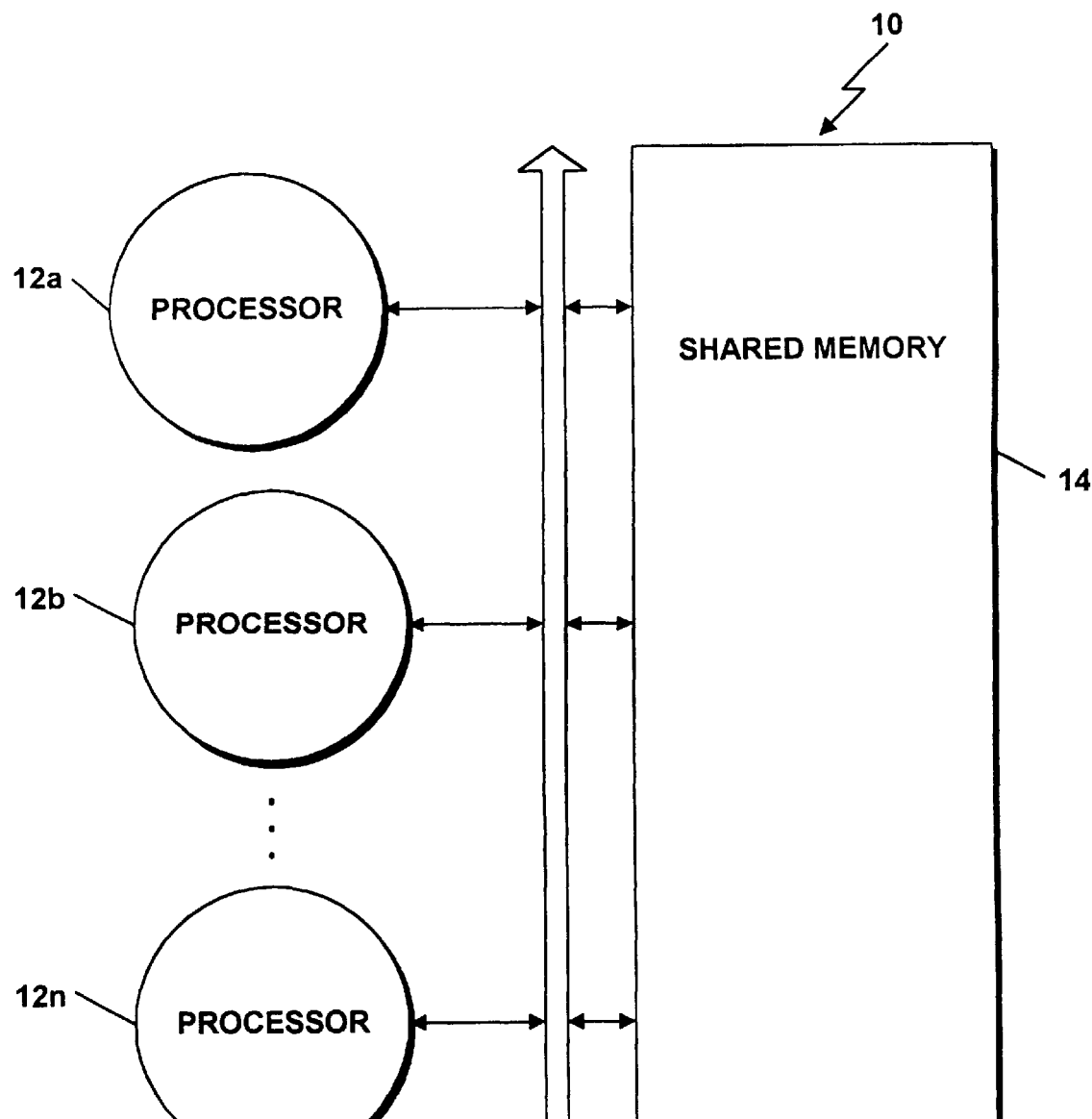
FIG. 1 is a block diagram of a multi-processing computer system which is suitable for use with the invention.

Referring to FIG. 1, a simplistic representation of a multi-processing network 10 includes individual processors 12a–12n of comparable capabilities interconnected to a system memory 14 through a system bus 16. All of the processors share access to the system memory as well as other I/O channels and peripheral devices (not shown). Each processor is used to execute one or more processes, for example, an application.

Figure 2:
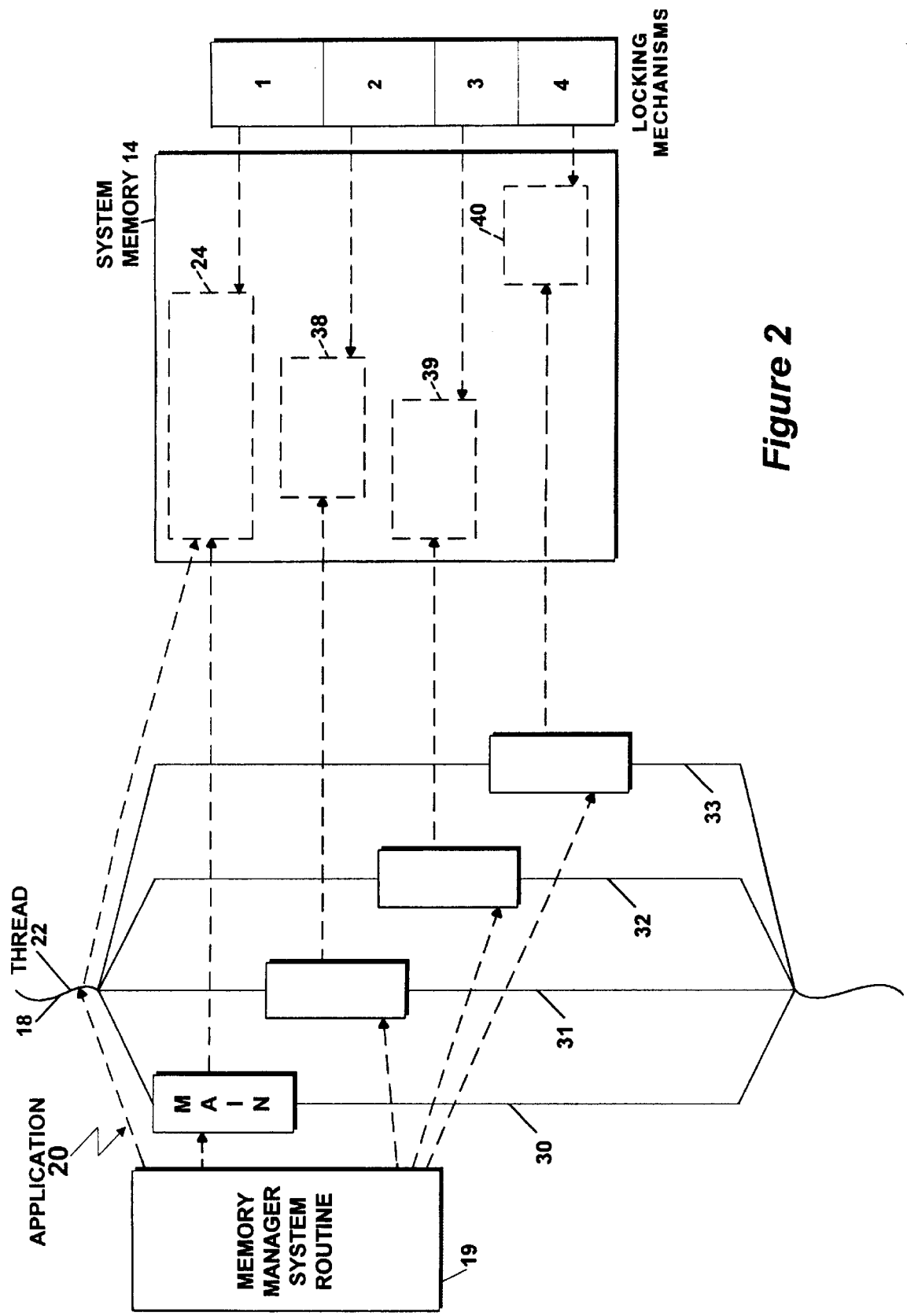
FIG. 2 illustrates the relationship between a multithreaded application and a shared memory.

Referring to FIG. 2, an application 20 which may be running on one or more of the processors 12a–12n (FIG. 1) is shown. Application 20 includes, here, a single thread 22 which has access to a section 24 of allocated memory within the system memory 14. This memory section is referred to as a memory pool. The application also includes a multi-threaded portion shown here having four threads 30–33. Although four threads are shown, the number of threads running at any given time can change since new threads may be repeatedly created and old threads destroyed during the execution of the application. Each of threads 30–33, for example, may run on a corresponding one of processors 12a–12n. In other applications, all or multiple threads can run on a single processor. Thread 30 is considered to be the main thread which continues to use the memory section 24 allocated by the application as a single thread. However, additional threads 31-33 allocate their own memory pools 38–40 from the system memory 14. Thus, each thread is associated with a memory pool for use in executing its operations. During the execution of the application running on the threads, each thread may be repeatedly allocating, freeing and reallocating memory blocks from its associated memory pool using memory allocation functions (i.e., malloc, free, realloc) which are described in greater detail below. Moreover, while one thread is generally designated as the main thread, some of the remaining threads may be designated for particular purposes.

Establishing Memory Pools

The number of memory pools (NUM_POOLS) is fixed. Although the malloc package programmer can change the number of pools, the package must be rebuilt after doing so.

Establishing a memory pool for each thread includes allocating a memory buffer of a preselected size (e.g., 64 Kbytes). In the event that the size of the memory pool has been exhausted, the size of the memory pool may be dynamically increased by allocating additional memory from the system memory. The initial memory pool and the additional memory may be allocated, for example, using a Unix system routine called sbrk( ) which, in this implementation, is called internally from within malloc and allocates the memory pool and additional memory in increments equal to the preselected size of the buffer memory. Allocating additional memory requires the pool to be locked which prevents other memory functions to be performed at the same time. Thus, the size of the memory buffer is selected to be large relative to the average amount of memory requested by malloc( ) so that calls for increasing the size of the pool are infrequent.

Each memory pool may be set up as a binary tree data structure with individual blocks of memory comprising the pool. The binary tree is ordered by size, although it may be ordered by address. Other data structures (e.g., linked lists) may alternatively be used; however, a binary tree structure may be preferred because of the increased speed it offers in searching. Moreover, a balancing or self-adjusting algorithm may be used to further improve the efficiency of the search.

Figure 3:
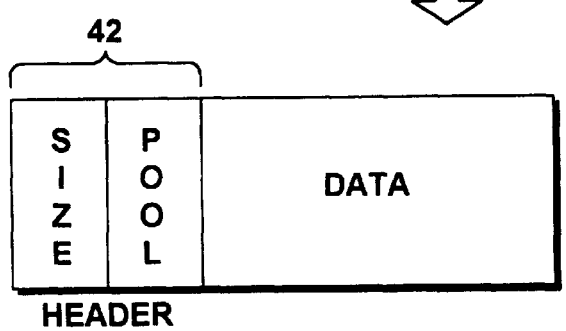
FIG. 3 diagrammatically illustrates a data object in memory.

Referring to FIG. 3, each block of memory 40 is identified by a data object 40 having a header 42 with a length consistent with the alignment requirements of the particular hardware architecture being used. For example, certain hardware configurations used by Sun Microsystems Inc., Mountain View, Calif. require the header to be eight bytes in length to provide an alignment boundary consistent with a SPARC architecture. The first four bytes of the header indicate the size of the block, with the remaining four bytes indicating a pool number.

Memory Management Functions

Each thread 30–33 allocates memory for its memory pool using a set of memory allocation routines similar to those from a standard C library. The basic function for allocating memory is called malloc and has the following syntax:

void * malloc (size)

where size indicates the number of bytes requested.

Another memory allocation routine is free which releases an allocated storage block to the pool of free memory and has the following syntax:

void * free (old)

where old is the pointer to the block of memory being released.

Still another memory allocation routine is realloc which adjusts the size of the block of memory allocated by malloc.

Realloc has the following syntax:
  void * realloc (old, size)
  where:
    old is the pointer to the block of memory whose size is being altered; and
    size is the new size of the block.

Converting an Existing Malloc Package to a Multithreaded Malloc Package

In order to convert an existing memory management package which uses a single lock to a parallel memory management package, all static variables used in the above described memory management functions are converted into static arrays. For example, the binary tree structures associated with the memory pools are stored as a static array. Each element of the static array is identified by its thread index and is associated with a given memory pool. There is a separate static array element within each array for each pool. Thus, searching through the particular data structure (e.g., binary tree) for each thread can be performed in parallel.

Each thread, therefore, can repeatedly execute any of the above routines to manage memory allocation of their associated memory pools. For example, referring again to FIG. 2, main thread 30 may execute a procedure in which memory blocks within memory pool 24 may be allocated, freed, and allocated again numerous times. Simultaneously, threads 31–33 may be executing procedures in which memory is being allocated and freed from and to their respective memory pools 38–40.

Mapping Threads to Memory Pools

Whenever a memory allocation function is called, a thread-identifying routine within each one of these functions is used to identify the thread making the memory allocation request. The thread-identifying function returns the thread index of the thread making the request. For example, the Solaris Operating System (OS), a product of Sun Microsystems Inc., uses in one implementation a function called thr_self ( ).

Another algorithm is then used to map each thread index to a memory pool number. For example, the described embodiment uses the following macro known as GET_THREAD_INDEX which receives the thread index and returns an associated pool number:

define GET_THREAD_INDEX(self) \ ((self) ==1 ? 0
    : 1 +((self)-4% (NUM_POOLS-1)
  where:
    self is the thread index; and
    NUM_POOLS is the number of memory pools.

As mentioned above, one thread is generally designated as the main thread with remaining threads designated for other purposes. For example, the SOLARIS OS uses a thread numbering system which reserves the first thread as a main thread, the second and third threads as system threads and subsequent threads as user threads. With the above macro, the memory pools are numbered 0 to NUM_POOLS-1. The first portion of the above macro (self ==1 ? 0) ensures that the main thread is always associated with the first pool number. Thus, if self is equal to 1 (i.e., it is the main thread), then the pool number is 0. Otherwise, as shown in the remaining portion of the macro after the ":", the remainder of the ratio of the thread index minus the constant four to the NUM_POOLS-1 is then added to the number 1 to arrive at the pool number. For example, if there are only four memory pools (i.e., NUM_POOLS=4) and the thread index is 4, the associated pool number returned by the macro is 1. Thread indices of 5 and 6 would have associated memory pools numbered 2 and 3, respectively.

Figure 4:
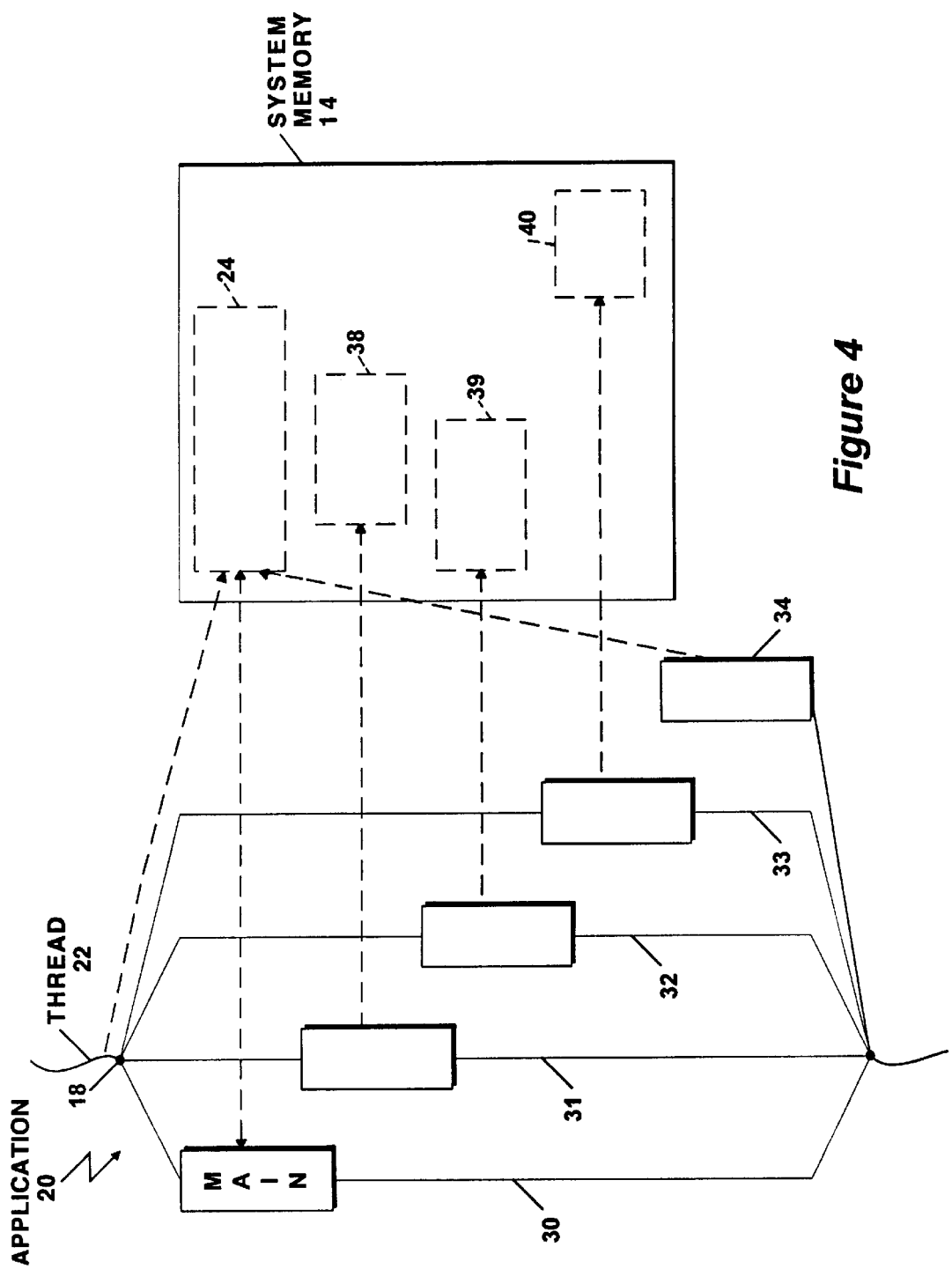
FIG. 4 illustrates the relationship between a multithreaded application and a shared memory in which more threads than memory pools exist.

In applications in which the number of threads existing at any given time exceeds the number of established pools, the additional threads share memory pools with another thread associated with that pool. Referring to FIG. 4, for example, an application is shown in which a new fifth thread 34 has been created. Because only four memory pools were established, the above mentioned macro is used to map thread 34 to first memory pool 24 originally associated with only thread 30. In this situation, the mutex lock associated with memory pool 24 prevents access by either thread 30 or 34, if the other is using the pool. In the example of the preceding paragraph, macro GET_THREAD_INDEX would map threads having thread indices of 4 and 7 to memory pool #1.

Code-Locking Memory Pools

Each memory pool 24 and 38-10 is protected by its own mutual exclusion (mutex) lock. Like the data structures associated with each memory pool, mutex locks are stored in a static array. Each mutex lock causes no delay in a thread that is allocating, deallocating or reallocating one or more memory blocks from its own memory pool. However, when a thread not associated with a particular memory pool attempts to access a memory block already allocated by the thread associated with that pool, the mutex lock prevents the non-associated thread from deallocating or reallocating a memory block from that pool. Thus, the lock protects the memory blocks from being updated or used by more than one thread at a time, thereby preventing the corruption of data in the memory block. Such attempts to allocate, deallocate or reallocate memory blocks from a memory pool not associated with a thread are relatively infrequent. This feature provides a substantial improvement in the speed performance of the system over conventional schemes in which a single mutex lock is used for all memory management routines. Using a single mutex lock can significantly degrade the performance of a multithreaded application. With this approach, once a thread makes a memory management function call (i.e., malloc, free, or realloc) all other threads must wait until the thread has finished performing its memory management function. By providing separate mutex locks for each memory pool, each thread can, in parallel, allocate and free its own memory within its own memory pool while preventing access from non-associated threads.

As memory blocks are repeatedly allocated, freed and reallocated by a thread, the memory pool may become fragmented into smaller and smaller blocks. Coalescing or merging of freed memory blocks which are contiguous is periodically performed to form larger memory blocks which can be reallocated by the thread. However, before a memory block can be coalesced with an adjacent memory block, the described embodiment first determines whether the blocks are form the same pool. If not, the blocks are not coalesced, thus avoiding the possibility of data corruption.

Merge Malloc Pools

The extent to which the individual threads use memory management may vary significantly. For example, referring again to FIG. 2, threads 31–33 may complete their tasks prior to the completion of the tasks performed by main thread 30. In such situations, the main thread may call an optional interface function which transfers the memory allocated by threads 31–33 to the main thread 30. In other words, the function may be called by the main thread at the end of the multithreaded portion to consolidate to the main thread the memory previously allocated by the other threads. The routine used in this embodiment has the following prototype:

void merge_malloc_pools (void);

The use of this function may not be needed in applications in which the multiple threads perform significant memory management throughout the application.

Figure 5:
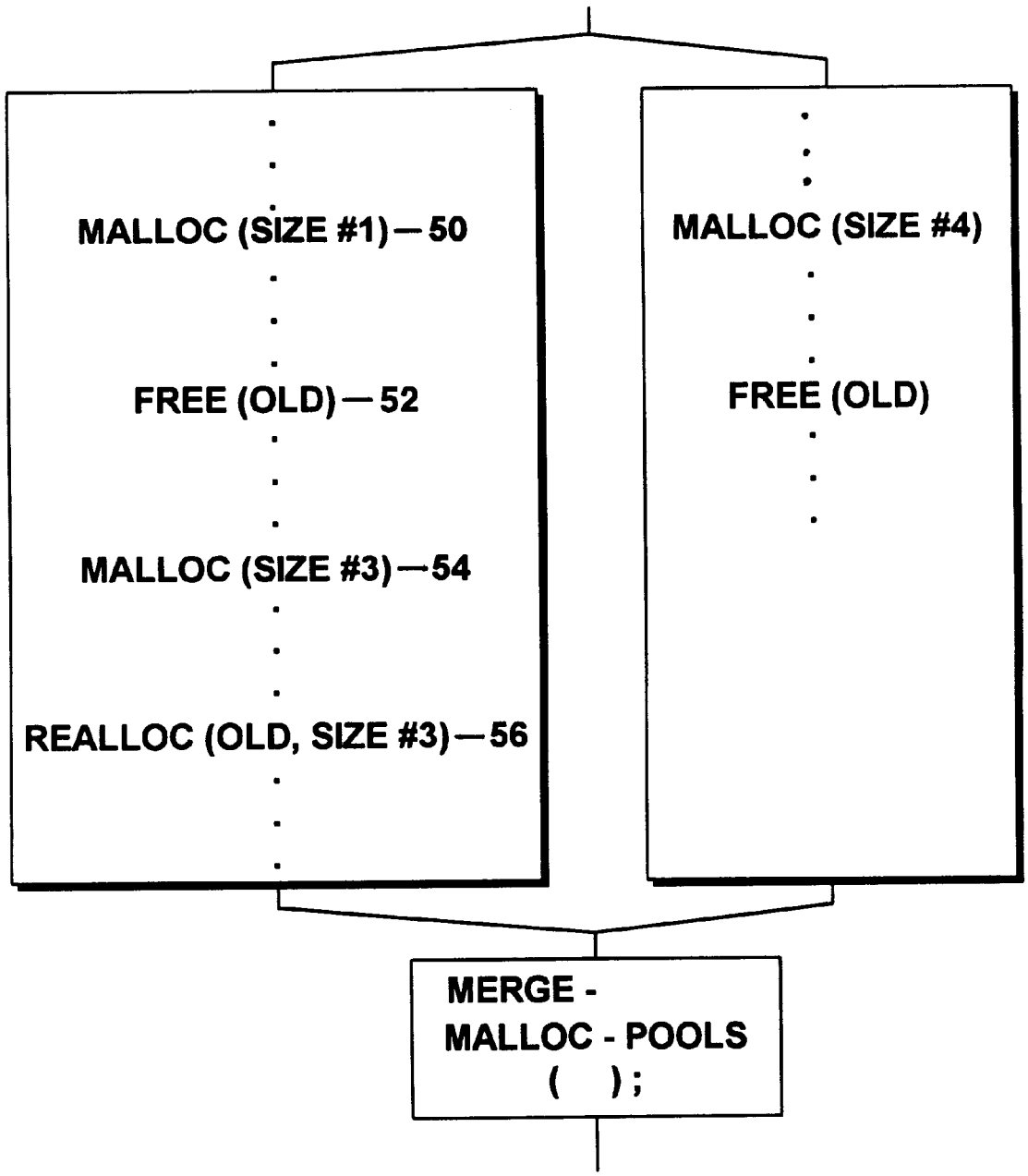
FIG. 5 is an example of an application which calls memory management functions from threads running within a process.

Referring to FIG. 5, a simplistic representation of an application is shown running within main thread 30 and user thread 31. It is assumed here that memory pools 24 and 38 (FIG. 2) which are associated with threads 30 and 31, respectively, have already been established. With respect to main thread 30, a first malloc routine call 50 is made requesting a block of memory having SIZE#1 bytes. Later in the application, a first free routine call 52 is made to return a block of memory identified by pointer OLD. At this time, coalescing is generally performed to combine the returned block of memory with an adjacent block, so long as they are both from the same memory pool. Still later in the thread, a second malloc routine call 54 is made requesting a block of memory having SIZE#2 bytes. A realloc call 56 requesting that a block of memory identified by pointer OLD be resized to SIZE#3 bytes follows. Thread 31 is shown executing procedures concurrently with thread 30. For example, a first malloc routine call 60 is made followed sometime later by a first free routine call 62. Finally, in this example, after completion of the multithreaded portion of the application, a merge_malloc_pools routine 64 is called to consolidate memory blocks allocated by thread 31 to the main thread 30.

Attached as an Appendix is source code software for one implementation of a method of converting an existing malloc package to a multithreaded version of a malloc package. The source code represents a version of the program based on the set of memory allocation routines described in *The C programmina language*, B. W. Kernighan and D. M. Richie, Prentice Hall (1988).

Other embodiments are within the following claims.

What is claimed is:

1. A method of allocating memory in a multithreaded computing environment in which a plurality of threads run in parallel within a process, each thread having access to a system memory, the method comprising:

using a memory manager system routine that is used in common by all of the threads and manages the system memory that is accessible to all of the threads for establishing a plurality of memory pools in the system memory, wherein each memory pool consists of memory blocks and has a separate locking mechanism associated therewith;

mapping each thread to one of said plurality of memory pools; and for each thread, dynamically allocating user memory blocks from the associated memory pool.

2. The method of claim 1 wherein the shared data structure associated with each memory pool is a binary tree data structure.

3. The method of claim 1 wherein the step of establishing a plurality of memory pools is performed by an operating system using a global mutex lock to manage the system memory.

4. The method of claim 1 wherein the step of dynamically allocating memory blocks includes designating the number of bytes in the block desired to be allocated.

5. The method of claim 1 further comprising the step of preventing simultaneous access to a memory pool by different threads.

6. The method of claim 1 further comprising the step of establishing a memory pool for each thread comprises allocating a memory buffer of a preselected size.

7. The method of claim 6 further comprising the step of dynamically increasing the size of the memory pool by allocating additional memory from the system memory in increments equal to the preselected size of the buffer memory.

8. The method of claim 6 wherein the preselected size of the buffer is 64 Kbytes.

9. The method of claim 1 further comprising the step of one of the threads transferring memory from the memory pool of another of the threads to its memory pool.

10. The method of claim 1 wherein each memory pool is defined by an array of static variables identified by a thread index associated with a memory pool.

11. The method of claim 10 wherein each memory pool is maintained as a data structure of memory blocks.

12. The method of claim 11 wherein each memory block comprises a header including the size of the memory block and the memory pool index to which it is associated.

13. The method of claim 12 wherein the size of the block and the memory pool index are each four bytes.

14. The method of claim 1 further comprising the step of each thread deallocating a memory block to the memory pool.

15. The method of claim 14 wherein the thread originally allocating the memory block deallocates it to its associated memory pool.

16. The method of claim 14 further comprising the step of coalescing deallocated memory blocks and preventing coalescing of memory blocks from different pools.

17. The method of claim 1 further comprising the step of changing the size of an allocated block of memory allocated by a memory pool.

18. A computer-readable medium storing a computer program which is executable on a computer including a memory, the computer program for allocating memory in a multithreaded computing environment in which a plurality of threads run in parallel within a process, each thread having access to a system memory, the stored program comprising:

computer-readable instructions which utilize a memory manager system routine that is used in common by all of the threads which manages the system memory that is accessible to all of the threads to establish a plurality of memory pools in the system memory, wherein each memory pool consists of memory blocks and has a separate locking mechanism associated therewith;

computer-readable instructions which map each thread to one of said plurality of memory pools; and computer-readable instructions which, for each thread, dynamically allocate user memory blocks from the associated memory pool.

19. The computer-readable medium of claim 18 wherein the shared data structure associated with each memory pool is a binary tree data structure.

20. The computer readable medium of claim 18 wherein the computer-readable instructions which utilize a global memory manager to establish a plurality of memory pools comprises instructions which control an operating system using a global mutex lock to manage the system memory.

21. The computer-readable medium of claim 18 wherein the stored program further comprises computer instructions which prevent simultaneous access to a memory pool by different threads.

22. The computer-readable medium of claim 18 wherein the stored program further comprises computer instructions which causes one of the threads to transfer memory from the memory pool of another of the threads to its memory pool.

23. The computer-readable medium of claim 18 wherein each memory pool is defined by an array of static variables identified by a thread index associated with a memory pool.

24. The computer-readable medium of claim 18 wherein the stored program further comprises computer instructions which coalesces deallocated memory blocks and prevents coalescing of memory blocks from different pools.

25. A system comprising:

memory, a portion of said memory storing a computer program for allocating memory in a multithreaded computing environment in which a plurality of threads run in parallel within a process, each thread having access to the memory, the stored program comprising:

computer-readable instructions which utilize a memory manager system routine that is used in common by all of the threads which manages the system memory that is accessible to all of the threads to establish a plurality of memory pools in the memory, wherein each memory pool consists of memory blocks and has a separate locking mechanism associated therewith;

computer-readable instructions which map each thread to one of said plurality of memory pools; and computer-readable instructions which, for each thread, dynamically, allocate user memory blocks from the associated memory pool;

a process to execute said computer-readable instructions; and a bus connecting the memory to the processor.

26. The computer-readable medium of claim 25 wherein the shared data structure associated with each memory pool is a binary tree data structure.

27. The system of claim 3 wherein the computer-readable instructions which utilize a global memory manager to establish a plurality of memory pools comprises instructions which control an operating system using a global mutex lock to manage the system memory.

* * * * *

UNITED STATES PATENT AND TRADEMARK OFFICE
CERTIFICATE OF CORRECTION

PATENT NO. : 6,058,460

DATED : May 2, 2000

INVENTOR(S) : Gregory Nakhimovsky

It is certified that error appears in the above-identified patent and that said Letters Patent is hereby corrected as shown below:

IN THE CLAIMS

Claim 27, column 10, line 12, please replace "The system of claim 3" with --The system of claim 25--.

Signed and Sealed this

Sixth Day of March, 2001

Attest:

NICHOLAS P. GODICI

Attesting Officer

Acting Director of the United States Patent and Trademark Office